(12) United States Patent
Beuchel et al.

(10) Patent No.: US 10,259,199 B2
(45) Date of Patent: Apr. 16, 2019

(54) POLYMER REINFORCED COMPOSITE PLYWOOD AND LAMINATES

(71) Applicant: ENGINEERED COMPOSITE SOLUTIONS, LLC, Watkinsville, GA (US)

(72) Inventors: Daniel Peter Beuchel, Monroe, GA (US); Rustom Sam Kanga, Kennesaw, GA (US)

(73) Assignee: ENGINEERED COMPOSITE SOLUTIONS, LLC, Watkinsville, GA (US)

( * ) Notice: Subject to any disclaimer, the term of this patent is extended or adjusted under 35 U.S.C. 154(b) by 0 days.

(21) Appl. No.: 15/487,897

(22) Filed: Apr. 14, 2017

(65) Prior Publication Data

US 2017/0217134 A1 Aug. 3, 2017

Related U.S. Application Data

(62) Division of application No. 14/498,367, filed on Sep. 26, 2014, now Pat. No. 9,688,056.

(Continued)

(51) Int. Cl.
*B32B 21/14* (2006.01)
*B32B 21/08* (2006.01)
(Continued)

(52) U.S. Cl.
CPC .............. *B32B 21/14* (2013.01); *B32B 7/02* (2013.01); *B32B 7/12* (2013.01); *B32B 21/02* (2013.01);
(Continued)

(58) Field of Classification Search
CPC .................................................... G11B 11/058
(Continued)

(56) References Cited

U.S. PATENT DOCUMENTS

| | | |
|---|---|---|
| 5,422,189 A | 6/1995 | Warner et al. |
| 5,427,842 A | 6/1995 | Bland et al. |

(Continued)

OTHER PUBLICATIONS

Non-Final Office Action in related U.S. Appl. No. 14/498,367, dated Aug. 2, 2016.

(Continued)

*Primary Examiner* — Brent T O'Hern
(74) *Attorney, Agent, or Firm* — Thomas Horstemeyer, LLP

(57) ABSTRACT

Various examples are provided for polymer reinforced composite plywood and laminates. In one example, among others, polymer reinforced composite plywood includes a multilayer polymeric film bonded to a first ply of wood veneer and a second ply of wood veneer. A second multilayer polymeric film can be bonded to the second ply of wood veneer and to a third ply of wood veneer. In another example, polymer reinforced composite plywood includes a monolayer polymeric film bonded to a first ply of wood veneer and to a second ply of wood veneer. A second monolayer polymeric film can be bonded to the second ply of wood veneer and to a third ply of wood veneer. In another example, low pressure laminate includes a polymeric film layer bonded to a base layer that forms a protective lamination layer over the base layer.

16 Claims, 6 Drawing Sheets

Related U.S. Application Data

(60) Provisional application No. 61/882,781, filed on Sep. 26, 2013.

(51) Int. Cl.

| | | |
|---|---|---|
| *B32B 7/02* | (2019.01) | |
| *B32B 7/12* | (2006.01) | |
| *B32B 21/02* | (2006.01) | |
| *B32B 21/04* | (2006.01) | |
| *B32B 27/08* | (2006.01) | |
| *B32B 27/12* | (2006.01) | |
| *B32B 27/30* | (2006.01) | |
| *B32B 27/36* | (2006.01) | |
| *B32B 27/40* | (2006.01) | |
| *B32B 37/12* | (2006.01) | |
| *B32B 38/00* | (2006.01) | |

(52) U.S. Cl.
CPC ............ *B32B 21/042* (2013.01); *B32B 21/08* (2013.01); *B32B 27/08* (2013.01); *B32B 27/12* (2013.01); *B32B 27/304* (2013.01); *B32B 27/308* (2013.01); *B32B 27/36* (2013.01); *B32B 27/365* (2013.01); *B32B 27/40* (2013.01); *B32B 37/1207* (2013.01); *B32B 38/0004* (2013.01); *B32B 2250/05* (2013.01); *B32B 2250/42* (2013.01); *B32B 2255/102* (2013.01); *B32B 2262/101* (2013.01); *B32B 2262/106* (2013.01); *B32B 2307/518* (2013.01); *B32B 2307/558* (2013.01); *B32B 2307/584* (2013.01); *B32B 2307/5825* (2013.01); *B32B 2307/712* (2013.01); *B32B 2307/714* (2013.01); *B32B 2419/00* (2013.01); *B32B 2419/04* (2013.01); *B32B 2419/06* (2013.01); *B32B 2471/00* (2013.01); *B32B 2607/00* (2013.01); *Y10T 428/24066* (2015.01); *Y10T 428/31786* (2015.04)

(58) Field of Classification Search
USPC ........................................................ 428/106
See application file for complete search history.

(56) References Cited

U.S. PATENT DOCUMENTS

| | | |
|---|---|---|
| 6,040,061 A | 3/2000 | Bland et al. |
| 6,119,422 A | 9/2000 | Clear et al. |
| 7,984,591 B2 | 7/2011 | Cashin et al. |
| 8,025,978 B2 | 9/2011 | Ruhdorfer |
| 8,158,228 B2 | 4/2012 | Wienke et al. |
| 2008/0233364 A1* | 9/2008 | Larson ............... B32B 5/28 428/196 |
| 2010/0326011 A1 | 12/2010 | Norling |
| 2011/0283876 A1 | 11/2011 | Foley et al. |
| 2012/0175206 A1 | 7/2012 | Kanous et al. |

OTHER PUBLICATIONS

Final Office Action in related U.S. Appl. No. 14/498,367, dated Nov. 28, 2016.
FEMA P-361, 2nd Ed., "Design and Construction Guidance for Community Safe Rooms", http://www.fema.gov/safe-room-resources/fema-p-361-design-and-construction-guidance-community-safe-rooms (Aug. 2008).
FEMA P-320, 3rd Ed., "Taking Shelter From the Storm: Building a Safe Room For Your Home or Small Business", http://www.fema.gov/safe-room-resources/fema-p-320-taking-shelter-storm-building-safe-room-your-home-or-small-business (Aug. 2008).
Plywood Manufacturing Process: http://www.epa.gov/ttn/chief/ap42/ch10/final/c10s05.pdf (Aug. 2003).
Scotchshield™ Ultra Security Window Film Systems, Explosive Blast Tests per GSA Security Criteria, 3M Corporation (Nov. 2003).
Specifications For 3M Scotchshield Safety and Security Window Film SH4CLARXL: http://www.epdwindowfilm.com/content/sh4spec.pdf (Feb. 2011).
Debris Impact Resistance of Building Assemblies, Texas Tech Final NIST Report (Aug. 2006).
Construction Materials Threshold Testing, Wind Science and Engineering Research Center, Texas Tech University (Nov. 2004).
What is a laminate? How decorative foils, low pressure laminates and high pressure laminates are produced, 1998 Plastic Laminates Symposium (Dec. 1998): http:/imisrisetappi.org/TAPPI/Products/PLS/PLS9801.aspx.
Laminating Composite Panels, http://www.flakeboard.com/docs/CPA/CPA%20-%20LaminatingCompositePanels.pdf (Dec. 2012).
APA Publications featuring Plywood, Adhesion Tests Overlays Plywood, http://www.apawood.org/level_c.cfm?content=pub_ply_libmain (Aug. 2013).

\* cited by examiner

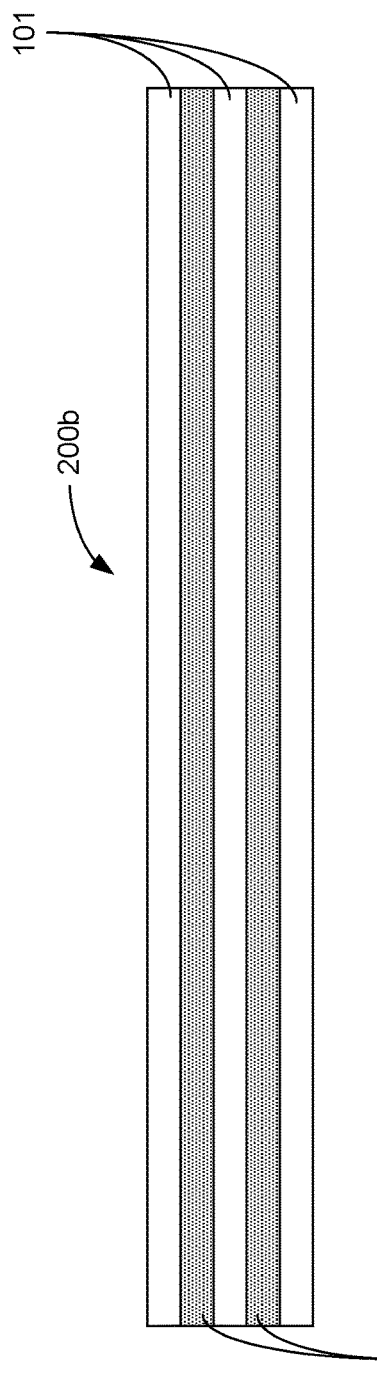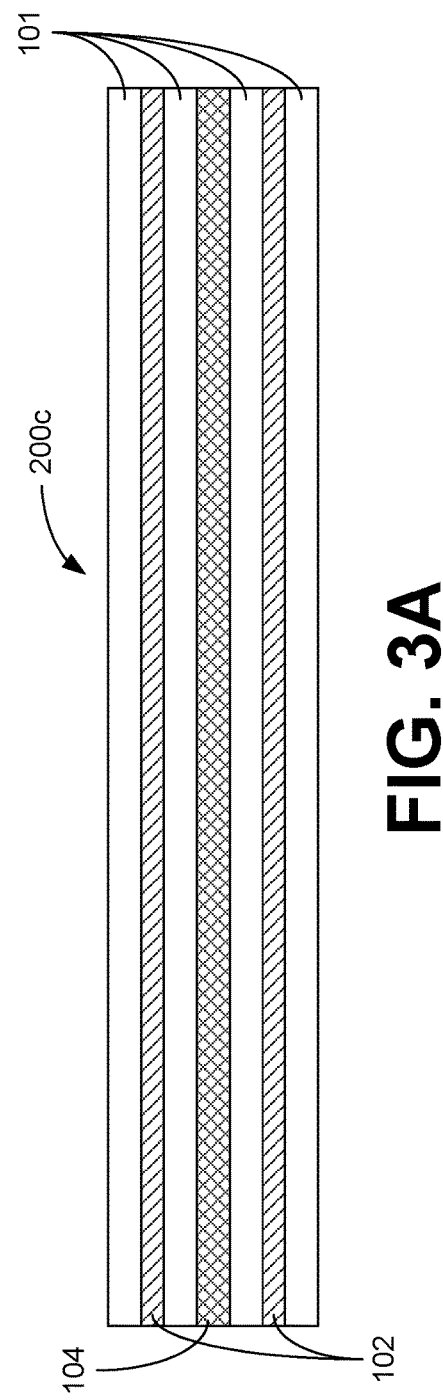

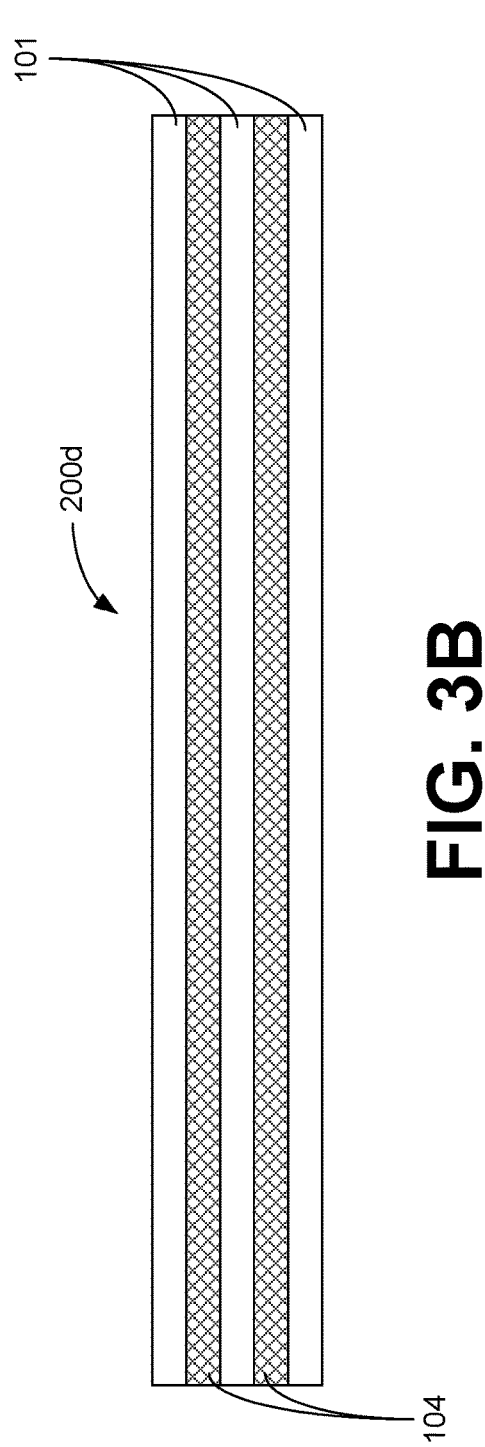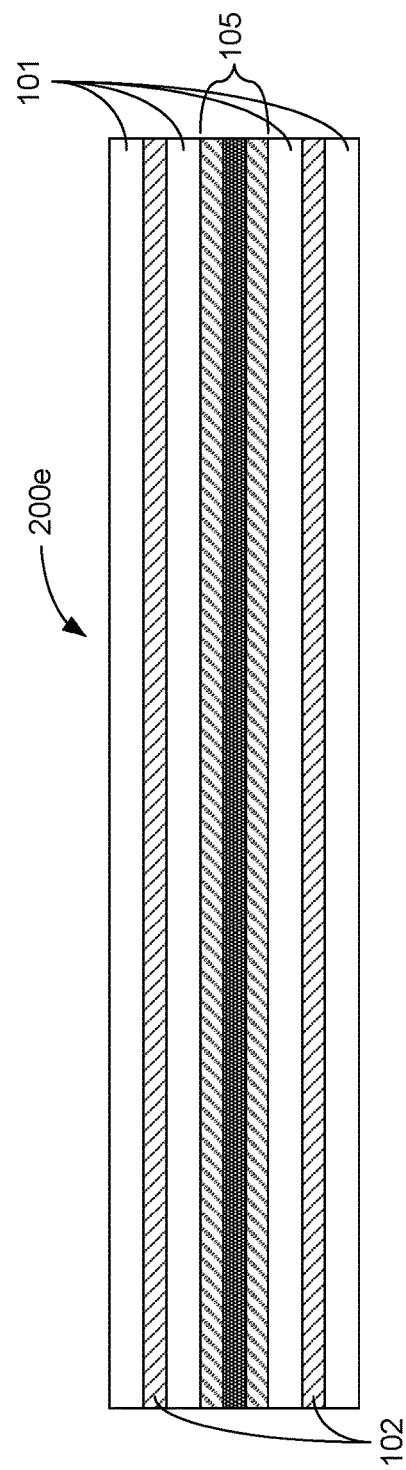
FIG. 3B
FIG. 4

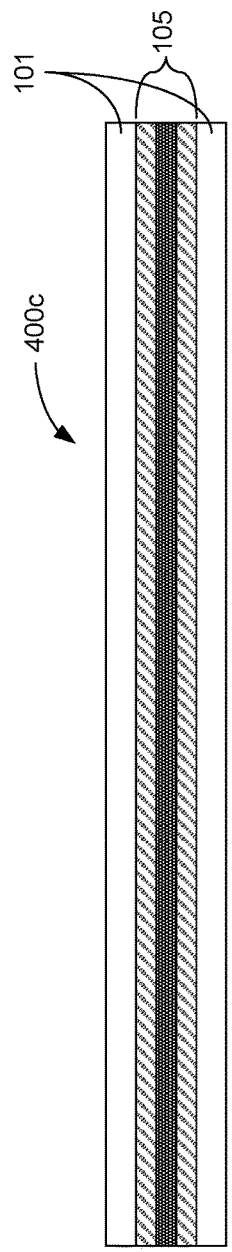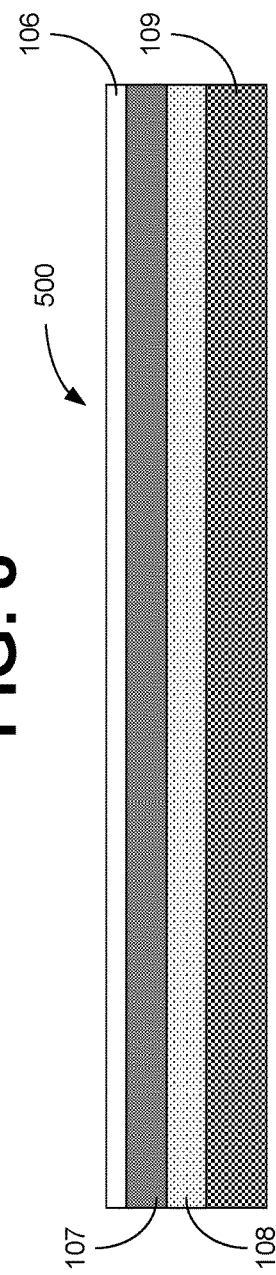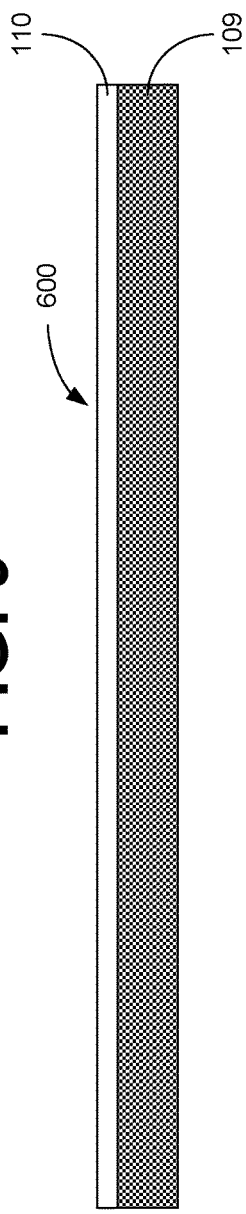

FIG. 11

| Panel # | # Wood Veneers | # of Films or Reinforcement | Composite Type | Composite Style or Designation | Reinforcement Type | Resin Type | Press Cook Time (sec) |
|---|---|---|---|---|---|---|---|
| 1 | 5 | 0 | "Control" | Veneer, 1/8th", 0.125 mil | None Control | LPF | 600 |
| 2 | 3 | 2 | Kydex PVC-Acrylic | Flax 72939 28 mil | Kydex PVC-Acrylic | LPF | 450 |
| 3 | 3 | 2 | Kydex PVC-Acrylic | Flax 72939 28 mil | Kydex PVC-Acrylic | LPF | 450 |
| 4 | 3 | 2 | Fiberglass Fabric | Style 7628 | Fiberglass | LPF | 450 |
| 5 | 5 | 0 | "Control" | Veneer, 1/8th", 0.125 mil | None Control | LPF | 600 |
| 6 | 3 | 2 | Micro-layered Polyester Film | 3M Ultra Scotchshield 600 gauge | 3M Ultra Scotchshield | XP-PRCP-ADH1 Adhesive | 600 |
| 7 | 3 | 2 | Micro-layered Polyester Film | 3M Ultra Scotchshield 600 gauge | 3M Ultra Scotchshield | pMDI | 450 |
| 8 | 3 | 2 | Micro-layered Polyester Film | 3M Ultra Scotchshield 600 gauge | 3M Ultra Scotchshield | pMDI | 450 |
| 9 | 3 | 2 | Micro-layered Polyester Film | 3M Ultra Scotchshield 600 gauge | 3M (PSA not removed) | pMDI | 450 |
| 10 | 3 | 2 | Micro-layered Polyester Film | 3M Ultra Scotchshield 600 gauge | 3M (PSA not removed) | pMDI | 600 |
| 11 | 3 | 2 | Polycarbonate Lexan | USPA2511 | Lexan Polycarbonate | pMDI | 450 |
| 12 | 3 | 2 | Kydex | Flax 72939 28 mil | Kydex PVC-Acrylic | pMDI | 450 |
| 13 | 3 | 2 | PEN Film SKC "Regular" PET | Tecnex Q51 700 gage | Tecnex Q51 PEN | pMDI | 450 |
| 14 | 3 | 2 | PET | SH408 700 gage | Skyrol SH-40 PET | pMDI | 450 |
| 15 | 3 | 2 | Lexan Polycarbonate | USPA2511 | Lexan Polycarbonate | pMDI | 450 |
| 16 | 3 | 2 | PEN Film | Tecnex Q51 700 gage | Tecnex Q51 PEN | pMDI | 450 |
| 17 | 3 | 2 | Kydex PVC-Acrylic | Flax 72939 28 mil | Kydex PVC-Acrylic | pMDI | 450 |
| 18 | 3 | 2 | SKC "Regular" PET | SH408 700 gage | Skyrol SH-40 PET | pMDI | 450 |
| 19 | 3 | 2 | Carbon Fabric | Style 84101 | | LPF | 360 | ns
POLYMER REINFORCED COMPOSITE PLYWOOD AND LAMINATES

CROSS REFERENCE TO RELATED APPLICATIONS

This application is a divisional application of U.S. non-provisional application entitled "Polymer Reinforced Composite Plywood and Laminates" having Ser. No. 14/498,367, filed Sep. 26, 2014, which claims priority to, and the benefit of, U.S. provisional application entitled "Polymer Reinforced Composite Plywood" having Ser. No. 61/882,781, filed Sep. 26, 2013, both of which are hereby incorporated by reference in their entireties.

BACKGROUND

Industrial construction materials such as engineered plywood are deficient in very extenuating situations such as regions that are vulnerable to hurricane force winds, tornadoes, and typhoons. In such regions, there is an increasing need for construction materials that would withstand such forces and meet stringent building codes. Traditional construction material such as plywood cannot protect buildings from impacts resulting from wind-borne debris during the hurricanes, tornadoes, and typhoons.

Many states in the United States have adopted new building codes to protect their population from devastating natural forces. Tornadoes, tropical storms and hurricanes are natural disaster-causing phenomenon. There is a high probability of severe windstorms and tornadoes occurring anywhere in the United States, especially east of the Rocky Mountains. Tropical storms and hurricanes have a high occurrence along the Gulf and Atlantic coasts. Whereas, in the Western Pacific, typhoons are tropical cyclones north of the equator and west of the international dateline that pose a threat to U.S. territories such as Guam and American Samoa. Typhoons like hurricanes can generate extreme winds, flooding, high-velocity flows, damaging waves, significant erosion, and heavy rainfall. These severe storm events threaten approximately three quarters of the nation's population, homes, and businesses.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2B, 3A-3B and 4 are cross-sectional or elevation views of examples of five-ply polymer composite reinforced plywood sheets in accordance with various embodiments of the present disclosure.

FIGS. 6, 7 and 8 are cross-sectional or elevation views of examples of three-ply polymer composite reinforced plywood sheets in accordance with various embodiments of the present disclosure.

FIG. 9 is a cross-sectional or elevation view of an example of a high pressure laminate (HPL).

FIG. 10 is a cross-sectional or elevation view of an example of a polymer composite reinforced, modified low pressure laminate (LPL) in accordance with various embodiments of the present disclosure.

FIG. 11 is a table listing polymer reinforced composite plywood samples fabricated for testing in accordance with various embodiments of the present disclosure.

DETAILED DESCRIPTION

Figure 1:
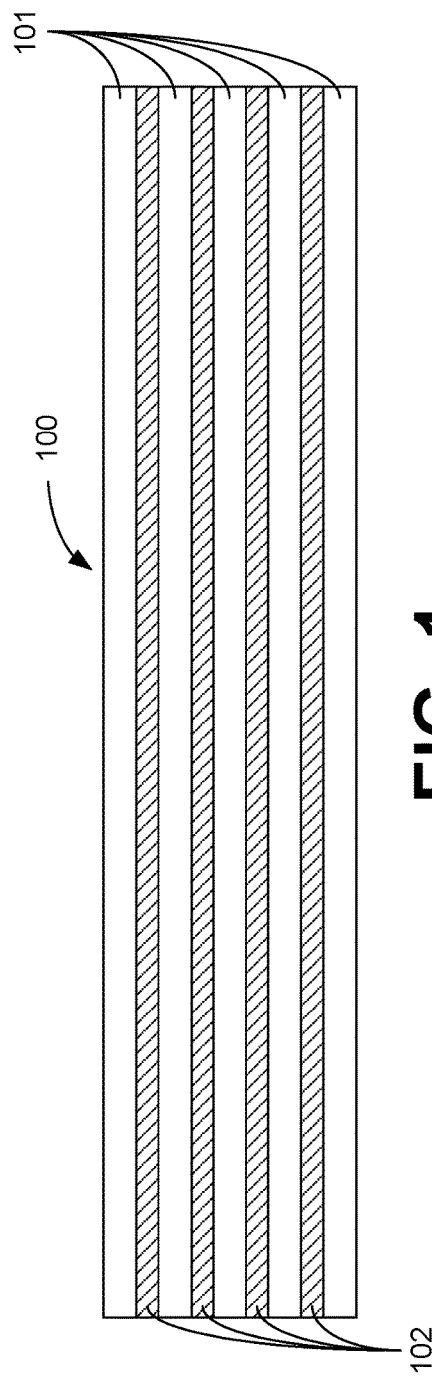
FIG. 1 is a cross-sectional or elevation view of an example of a five-ply plywood sheet.

Disclosed herein are various examples related to polymer reinforced composite plywood. The present disclosure relates generally to a composite plywood material and in particular to an impact resistant and protective engineered wood composite. The present disclosure also relates to improved composite panels used in the ready-to-assemble (RTA) furniture market, specifically low pressure laminates (LPL) and high pressure laminates (HPL). Reference will now be made in detail to the description of the embodiments as illustrated in the drawings, wherein like reference numbers indicate like parts throughout the several views.

Experience with tornadoes and hurricanes in the U.S., especially those that are considered to be located in high velocity zones, have established the importance of new building standards to provide protection from wind-borne debris and the devastating effects of severe pressure differentials, caused by these storms, in particular, hurricanes. Compromising a building's envelope system by windborne debris, is likely to cause significant damage to the building's contents, possible failure of the building's structural systems, and present a hazard to the building's occupants and surrounding individuals. For this reason, the building design process should address these performance enhancing attributes found in impact resistant plywood. Hurricanes are not the only devastating natural force. The ferocity and devastation of tornadoes has been shown in particular, the storm system that struck Oklahoma and Kansas in 1999, causing the deaths of 44 people; the 2011 system that struck Joplin, Mo., killing 158 people; the 2011 Tuscaloosa-Birmingham tornado that killed 64 people; and the recent storm that struck Moore, Okla., and adjacent areas, killing 24 people. All of these tornado systems, in addition to causing the loss of life have attributed to billions in dollars in damages.

Miami-Dade County in Florida adopted a set of strict test protocols, in response to hurricane Andrew, which specify that all builders and architects meet and/or exceed the quantified number of impacts. Certified products will receive a Notice of Acceptance (NOA) Code bearing the product approval. In particular, these test standards are: Florida Testing Application Standard (TAS) 201-94, Impact Test Procedures; Florida Testing Application Standard (TAS) 202-94, Criteria for Testing Impact and Non-Impact Resistant Building Envelope Components Using Uniform Static Air Pressure Loading; and Florida Testing Application Standard (TAS) 203-94, Criteria for Testing Products Subject to Cyclic Wind Pressure Loading. These standards have been designed mainly for exterior openings such as windows and doors, since they are the weakest point for the buildup of positive internal pressures, within the house, which will increase the effect of external negative (suction) pressures. The external negative pressures will try to push off the roof and push out the side and leeward walls, which is another reason to protect all external openings.

The Miami-Dade Building Code specifies that every exterior opening, residential or commercial be provided with protection against wind-borne debris caused by hurricanes. Such protection could either be shutters or impact-resistant products. There are two types of impact-resistant criteria, specifically for large-missile resistance and small-missile resistance.

Large-missile resistant: A product is declared large-missile resistant after it has been exposed to various impacts with a piece of lumber weighing approximately 9 pounds, measuring 2 inches×4 inches×9 feet in size, traveling at a speed of 50 feet per second (34 miles per hour or mph). The product needs to also pass positive and negative wind loads for a total of 9,000 cycles.

Small-missile resistant: A product is declared small-missile resistant after it has been exposed to various impacts with 10 ball bearings traveling at a speed of 80 feet per second (50 mph). The product is then subjected to wind loads for 9,000 cycles.

The performance requirements for Miami-Dade are higher than for the rest of Florida. For areas in Florida not considered to be a high velocity hurricane zone (HVHZ), the builder needs to meet both ASTM E 1886 Standard Test Method for Performance of Exterior Windows, Curtain Walls, Doors, and Storm Shutters Impacted by Missile(s) and Exposed to Cyclic Pressure Differentials; and ASTM E 1996 Standard Specification for Performance of Exterior Windows, Curtain Walls, Doors and Storm Shutters Impacted by Windborne Debris in Hurricanes. These are also the test standards specified for product approval in the International Building Code (IBC) for use in Windborne Debris Regions of Hawaii, the Caribbean Islands, and Other U.S. Coastal Areas.

The Miami-Dade County test standards are the most stringent and products that pass it will also pass ASTM E 1886 & ASTM E 1996. However, products that pass the aforementioned ASTM standards will not necessarily pass the Miami-Dade County test standards. Products can be designed to meet and/or exceed the Miami-Dade County test standards, and thus the ASTM standards.

Similar codes have been implemented in tornado prone states in the mid-west U.S. This improved composite plywood constructions will allow for use in areas subjected to not only impacts caused by wind-borne debris due to hurricanes, but also tornadoes, and the falling debris and dynamic shifts in load-bearing walls seen in earthquake prone regions as well. Two national codes established the minimum debris resistance for acceptance criteria in the external envelope for safe room construction. These codes were developed by FEMA and released in 2000 as FEMA 361, "Design and Construction Guidance for Community Shelters" and FEMA 320, "Taking Shelter from the Storm: Building a Safe Room Inside Your House".

The guidance for community shelters per FEMA 361 calls for "The Tornado Missile Impact Criteria to use 250 mph as the safe room maximum wind hazard speed, and withstand a 15-lb 2×4 wood board missile traveling horizontally at 67 mph and vertically at 100 mph." Likewise, according to FEMA 361: "The Hurricane Missile Impact Criteria should be designed using 255 mph as the maximum wind speed hazard, withstanding impacts from a 9-lb 2×4 wooden board missile, traveling horizontally at 26 mph and vertically at 128 mph."

The private residential criteria for building a safe room per FEMA 320, incorporates a high standard of resisting impact from a 15-lb 2×4 inch board at 100 mph horizontally and 67 mph vertically.

Many different forms of building materials have been used in the construction market to date, most notably are building fabric used to wrap or blanket the exterior of the building. These products are commonly referred to as housewraps. Housewraps in general are designed to provide protection against water and air infiltration. They also allow for water vapor to move across the building material gradient. However, the water vapor transmission is not one way and as a result, it is possible to have moisture build up behind the building fabric. This can create an environment suitable for rot and possibly mold growth. In addition to this, the housewraps do not provide any protection against impacts and have little to none puncture resistance.

Materials have been introduced to the market place, which meet the Miami-Dade County impact requirements. Most of these protective wall products are either metal, metal clad, or cementitious in nature. In general, while these products do provide protection against the detrimental impacts and pressure changes associated with hurricanes and tornadoes, they are costly from a material and or manufacturing standpoint; heavy, which can increase the structural load stress causing deformations and failures to the structure; and can be very time consuming to install. An example is given in U.S. Pat. No. 6,119,422, which is described as a multilayered impact resistant building panel having an insulating foam core that is sandwiched between a fiberglass mesh reinforced cementitious panel and a plywood sheet. Although this commercial product might withstand certain hurricane and tornado force winds, it has multiple material layers which are not manufactured in sequence, thus greatly increasing cost. The material is also very heavy, compared to typical sheathing, which limits the amount which can be carried and installed either manually or with lift, due to the physical weight restrictions. Likewise, U.S. Pat. No. 7,984,591 describes an impact resistant house wrap which typically only provides a single exterior layer. This house wrap may not meet the newer codes and standards for hurricane and tornado prone areas as introduced by FEMA. Additionally, the protection layer is at the surface, which does not provide adequate structural protection and integrity. Again, the house wrap example is produced in an offline process, which is both costly and time consuming from a manufacturing standpoint.

Referring to FIG. 1, shown is a cross-sectional or elevation view of an example of a standard five-ply (or 5-layer) plywood sheet 100 including five layers 101 of wood veneer secured together using an adhesive 102 disposed between the wood layers 101. The composite plywood construction disclosed in the present disclosure is designed to be manufactured inline during the manufacturing process of the plywood. The manufacturing sequence of the plywood will contain the polymeric material, either as a single layer or as a plurality of intermittent layers, within the plywood veneer. This may be shown to provide a significant improvement to the impact resistance, protection from water intrusion, and create an air barrier system, while providing a product with better functionality than a traditional house wrap. Thus, there still exists a need for a product that can meet the stringent impact resistance standards of hurricane, tornado, and even typhoon prone regions for both commercial and residential structures, while being relatively inexpensive and easy to manufacture in existing construction material and manufacturing processes, as well as, allow for ease of installation for the end customer.

As previously discussed, the present disclosure relates to a plywood substrate comprising of a single intermittent layer or a plurality of intermittent layers of either a flexible polymeric film or a lamination. The one or more intermittent layers can be designed to be stiff and/or ductile. The intermittent layers may also be tear resistant multi-layered polymeric films having alternate stiff and ductile layers.

Examples of monolayer polymeric films that can be utilized include, but not limited to, polyesters, polyamides, polyimides, polyether-sulfones & polyetheretherketones, polycarbonate, or polyolefins; and/or polymeric films laminated to that of a spun laid and bonded nonwoven polymer, or woven materials such as glass fabric, aramid fiber, carbon fiber, polyester scrim, polyamide fiber, etc. The substrate is then incorporated between the layers of plywood sheathing, exterior plywood siding, laminated veneer lumber, and/or plywood subfloor during its manufacturing process in a continuous roll form. The polymer reinforcement forms a weather resistant barrier and provides improved energy efficiency by increasing the thermal resistance of the plywood. When used in the application of roof or wall sheathing, structural plywood such as laminated veneer lumber, exterior siding, and or flooring products, the impact strength is increased compared to traditional veneer plywood.

An example of polymer reinforced composite plywood can comprise the following: one or more intermittent layers of monolayer polymeric films such as, e.g., a polyester, polyamide, polyimide, polyether-sulfones & polyetheretherketones, thermoplastic polyurethanes, polycarbonate, or polypropylene. The polymer reinforced composite plywood can also comprise laminated layers of polymeric films, polymeric films laminated to a spun laid and bonded nonwoven polymer, or woven materials such as glass fabric, aramid fiber, carbon fiber, polyester scrim, polyamide fiber, etc. This composite material can be processed in roll form and can be incorporated and bonded between the veneer layers of plywood via flame lamination, thermal lamination, extrusion lamination, ultrasonic welding, and/or using adhesive lamination techniques. In one embodiment of the present disclosure, polyester film is laminated between the plywood layers by means of thermal lamination, which activates one or more adhesive coating(s) and/or extruded layer(s) of the polyester allowing for a high strength interfacial bond to the wood veneer layers. Alternately, thermosetting resin adhesives can also be used for high strength interfacial bond to the wood veneer layers.

Polymer reinforced composite plywood can also provide advantages and improvements to the low pressure laminate (LPL) market. There are two types of laminates in the market today, high pressure laminate (HPL) and low pressure laminate (LPL). The four most common brand names in the U.S. are Formica®, Wilsonart®, Pionite®, and Nevamar®.

Impregnating layers of kraft paper produced from chemical pulp produced in the kraft process with melamine resin creates melamine laminate. This newly formed layer of laminate can be combined with a decorative film layer (like a wood grain, solid color, or pattern) and then attached to a wooden substrate like fiberboard or particleboard core materials. The resulting products can be used in furniture, counter tops, walls, floors, and elsewhere. The process by which the melamine infused, laminate paper is attached to the substrate is where HPL and LPL differ.

For HPL, the layer of laminate is adhered to the substrate under pressures of 70 to 100 bars and at temperatures of 280 to 320° F. using adhesives.

For LPL, the layer of laminate is adhered to the substrate under pressures of 10 to 30 bars and at temperatures of 150 to 375° F. with no adhesives.

The price of LPL is usually less than HPL simply because it does not cost as much to manufacture. Both have flame retardant and antibacterial properties, and can be resistant to chemicals and heat. However, HPL is more durable because it has a protective overlay, whereas LPL does not and therefore has a lower impact, scratch, and abrasion resistance. HPL is made of several sheets of paper that get bonded together using high pressure presses. It is used in many horizontal applications such as counter tops and higher quality table tops. Vertical surfaces tend to incorporate more LPL type products and common uses are typically for doors and drawer fronts of cabinets.

The increased cost of oil and natural gas has a major effect on melamine, phenol, and formaldehyde; all major ingredients in LPL and HPL laminates. Melamine crystal plants have closed because of losses and new plants have been put on hold because of poor return on investment. This could cause a major shortage in the primary chemicals used in these decorative laminates.

One embodiment includes a polymeric film, such as polyester, having both a high degree of resistance to impact, water, chemicals, and minor abrasions, which is affixed directly to medium density fiberboard (MDF), chipboard, and or plywood. This can be referred to as a modified LPL. This polymeric material will be reverse printed with a wood grain type motif, pattern, or similar color; which when bonded to the board will provide a surface protection to the printed side of the polymeric material and eliminate both the current protective overlay, used as protection for the decorative paper, and the decorative paper itself. When using a tear resistant polyester film, the Kraft paper backer may also be eliminated. Thus, the manufacturer can provide a very economical and durable laminate material.

Interleaved polymeric films can improve the engineered composite plywood to lend functionality to the construction material. Although not exhaustive, the polymeric film and other film types (e.g., nonwoven web types, nonwoven web materials, woven or scrim materials) may be advantageously employed. Polymeric film types include mono-layer polymeric films; multi-layer, co-extruded polymeric films; or micro-layered polymeric films which are biaxially oriented or mono-axially oriented. Polymeric film types include polyesters (e.g., polyethylene terephthalate (PET), polyethylene naphthalate (PEN), polybutylene terephthalate (PBT), polytrimethylene terephthalate (PTT), polyhydroxybutyrate (PHB), polylactic acid (PLA), etc.), polyamides (e.g., polyamide 6 (PA6), polyamide 66 (PA66), polypthalamides, etc.), polyolefins (e.g., polyethylene (PE), polypropylene (PP), metallocenes, ethylene vinyl acetate (EVA), ethylene methyl acrylate (EMA), ethylene acrylic acid (EAA), etc.), polyimide (PI), polyphenylene sulfide (PPS), polysulfone (PSO), polyethersulfone (PES) such as, e.g., thermoplastic polyurethanes (TPU) by Skydex® Technologies, Inc. discussed in U.S. Patent Application Publication Nos. 2011/0283876 and 2012/0175206, tear resistant multi-layer film such as the 3M® products discussed in U.S. Pat. Nos. 5,427,842 and 5,422,189 and/or Protekt® multilayered PET film from Madico. As described in U.S. Pat. Nos. 5,427,842 and 5,422,189 the tear resistant multi-layer film from 3M® can include a plurality of up to 26 or up to 39 sub-layers which are alternately stiff and ductile. The stiff sub-layer comprises of a stretch resistant, creep resistant and dimensionally stable polymeric systems such as biaxially oriented polyesters including polyethylene terephthalate, polyethylene naphthalate, polybutylene terephthalate, and polybutylene naphthalate, as well as blends thereof, The amorphous, ductile and pliable sub-layers comprises of copolyesters such as PET-G or other systems such as EVA, polyolefins, etc.

Nonwoven web types can include air laid systems, carded systems, spun lace systems, hydroentangled, melt blown, and spunbonded systems. Nonwoven web materials can include polypropylene (PP), polyethylene (PE), polybutylene terephthalate (PBT), polyethylene terephthalate (PET), polyamides (PA), polychlorides (PC), polyurethanes (PU), aramid or aromatic polyamides, and/or hybrid or bicomponent fibers. Woven or scrim materials can include aramid fiber, carbon fiber, polyester, polyamides, fiberglass and/or hybrid or bicomponents. Laminations comprising combinations of any of the above materials can also be used.

Figure 2A:
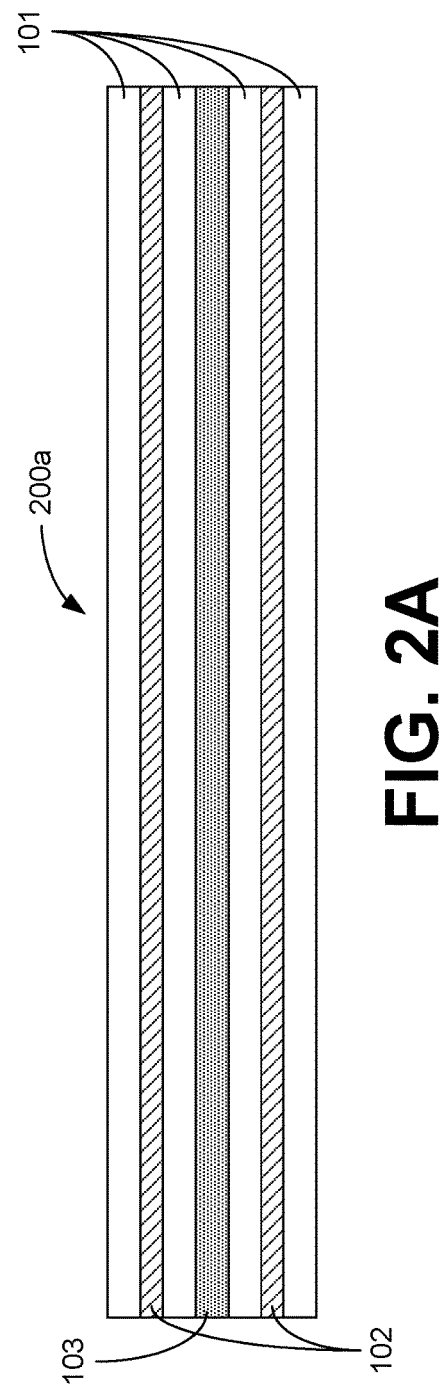

Referring now to FIGS. 2A-2B, 3A-3B and 4, shown are cross-sectional or elevation views of examples of polymer composite reinforced plywood sheets 200 including 5 layers. The polymer composite reinforced plywood can comprise a plurality of wood layers 101 and one or more intermittent layers of a flexible polymeric film and/or a lamination. In the examples of FIGS. 2A and 2B, the polymer composite reinforced plywood sheets 200a and 200b can be modified 5-ply (or 5-layer) plywood using ultra tear resistant multilayer PET film 103 from 3M® and/or Protekt® multilayer PET film from Madico having intermittent stiff and ductile layers. In the plywood sheet 200a of FIG. 2A, the third wood veneer layer 101 is replaced with the ultra tear resistant multilayer PET film 103, which is sufficiently laminated to the adjacent wood veneer layers 101 so as to not need the use of standard veneer adhesives 102 for achieving such lamination. For instance, 3M's Ultra 400 (4 mil) tear resistant polyester film 103 can be used to replace the third wood veneer ply 101 within the 5-ply (5-layer) plywood construction or 3M's Ultra 600 (6 mil) tear resistant polyester film or Madico's Protekt® LCL-600XSR multilayer film (6 mil) 103 can be used to replace the third wood veneer ply 101 within the 5-ply (5-layer) plywood construction. An adhesive suitable for the polymeric film 103 such as, but not limited to, polymeric MDI adhesive can be applied to the polymeric film 103 to bond the polymeric film 103 to the wood veneer layers 101. In alternative embodiments, the adhesive can be applied to the wood veneer layers 101 to bond with the polymeric film 103. In some implementations, a heat activated adhesive (e.g., vinyl acetate emulsions with polyurethane dispersions or VA-E/PUD) may be applied to the polymeric film 103 to facilitate bonding with the wood veneer layers 101. The heat activated adhesive can be a non-tacky, non-blocking adhesive which can be coated during the PET manufacturing process and used without the need for additional thermosetting adhesive.

In the plywood sheet 200b of FIG. 2B, the second and fourth layers of wood veneers 101 can be replaced by the 3M® ultra tear resistant multilayer PET film 103 and/or a multilayer PET film from Madico. In one embodiment, among others, 3M's Ultra 600 (6 mil) tear resistant polyester film and/or Madico's Protekt® LCL-600XSR multilayer film (6 mil) 103 can be used to replace both the second and fourth wood veneer plys 101 within the 5-ply (5-layer) plywood construction. Polymeric MDI adhesive applied to the polymeric firm 103 can provide sufficient bonding to the adjacent wood veneer layers 101.

In the examples of FIGS. 3A and 3B, the polymer composite reinforced plywood sheets 200c and 200d are modified 5-ply (or 5-layer) plywood using other polymeric films 104 (including both stiff/biaxially oriented and ductile/amorphous systems) such as, but not limited to polyesters or polycarbonates. In the plywood sheet 200c of FIG. 3A, the third wood veneer layer 101 can be replaced with a polyester film (stiff, biaxially oriented), a polycarbonate film (ductile, amorphous and pliable), copolymers of PVC and acrylic film (ductile, amorphous and pliable) and/or thermoplastic polyurethane. For instance, an eight mil (8 mil) polyester film 104 can be used to replace the third wood veneer ply 101 within the 5-ply (5-layer) plywood construction or Skydex® Technologies, Inc. (5 mil~10 mil) overpressure absorbing film and/or Kydex (Acrylic-PVC Copolymer) Flax 72939 28 mil film can replace the third wood veneer ply 101 within the 5-ply (5-layer) plywood construction.

In the plywood sheet 200d of FIG. 3B, the second and fourth layers of wood veneers 101 have been replaced by a polyester film (stiff, biaxially oriented), a polycarbonate film (ductile, amorphous and pliable), copolymers of PVC and acrylic film (ductile, amorphous and pliable) and/or thermoplastic polyurethane. For example, an eight mil (8 mil) polyester film 104 can be used to replace the second and fourth wood veneer plys 101 within the 5-ply (5-layer) plywood construction or Skydex® Technologies, Inc. (5 mil~10 mil) overpressure absorbing film and/or Kydex (Acrylic-PVC Copolymer) Flax 72939 28 mil film can replace the second and fourth wood veneer plys 101 within the 5-ply (5-layer) plywood construction. The two polymer film layers 104 can be the same or different film materials (e.g., both layers stiff or ductile, or one layer stiff and the other layer ductile). A suitable adhesive applied to the polymeric films 104 can provide sufficient bonding to the adjacent wood veneer layers 101 so as to not need the use of standard veneer adhesives 102 for achieving such lamination.

In the example of FIG. 4, the polymer composite reinforced plywood sheet 200e is modified 5-ply (or 5-layer) plywood using other composite laminates 105. In the plywood sheet 200e of FIG. 4, the third wood veneer layer 101 can be replaced with aramid fiber, carbon fiber, and/or fiberglass. Laminate layer 105 is not limited to a fiber laminated between two polyester films, which can include an existing adhesive layer having suitable adhesion to the wood veneer. For instance, BGF Industries Inc., (4 mil~10 mil) woven Kevlar fabric, which can be laminated to a polyester film, and used to replace the third wood veneer ply 101 within the 5-ply (5-layer) plywood construction, BGF Industries Inc., (5 mil to 10 mil) high strength woven carbon fiber fabric, which can be laminated to a polyester film, and used to replace the third wood veneer ply 101 within the 5-ply (5-layer) plywood construction, or BGF Industries Inc., (5 mil to 10 mil) high strength woven glass fabric, which can be laminated to a polyester film, and used to replace the third wood veneer ply 101 within the 5-ply (5-layer) plywood construction. An adhesive suitable for the polymeric film 103 (e.g., polymeric MDI adhesive) can be applied to the polymeric film 103 to bond the polymeric film 103 to the wood veneer layers 101. In this way, the polymeric films in the laminate layer 105 can provide sufficient bonding to the adjacent wood veneer layers 101 so as to not need the use of standard veneer adhesives 102 for achieving such lamination.

In other embodiments, the second and fourth layers of wood veneers 101 have been replaced by with aramid fiber, carbon fiber, and/or fiberglass. For example, BGF Industries Inc., (4 mil~10 mil) woven Kevlar fabric, which can be laminated to a polyester film, and used to replace both the second and fourth wood veneer plys 101 within the 5-ply (5-layer) plywood construction, BGF Industries Inc., (5 mil to 10 mil) high strength woven carbon fiber fabric, which can be laminated to a polyester film, and used to replace both the second and fourth wood veneer plys 101 within the 5-ply (5-layer) plywood construction, or BGF Industries Inc., (5 mil to 10 mil) high strength woven glass fabric, which can be laminated to a polyester film, and used to replace both the second and fourth wood veneer plys 101 within the 5-ply (5-layer) plywood construction.

Figure 5:
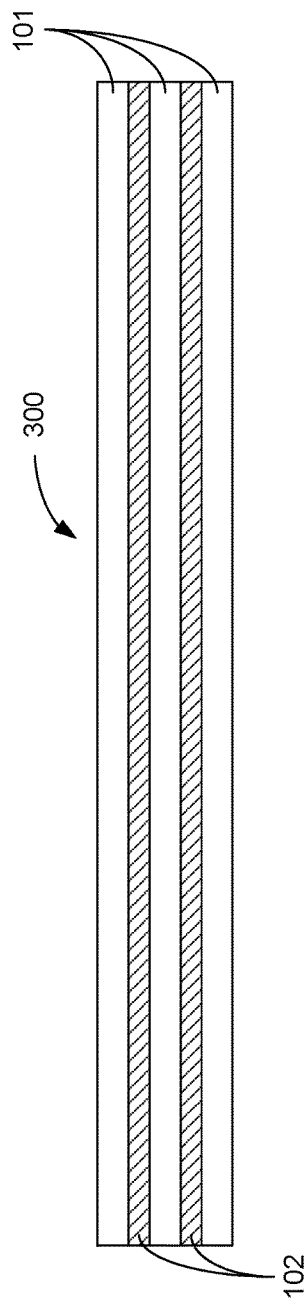
FIG. 5 is a cross-sectional or elevation view of an example of a three-ply plywood sheet.
Figure 6:
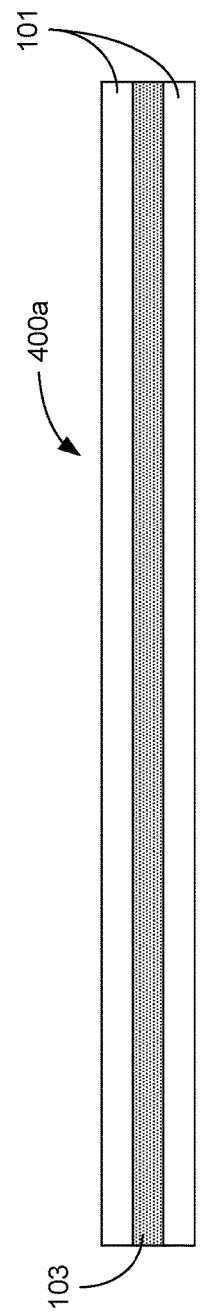
Figure 7:
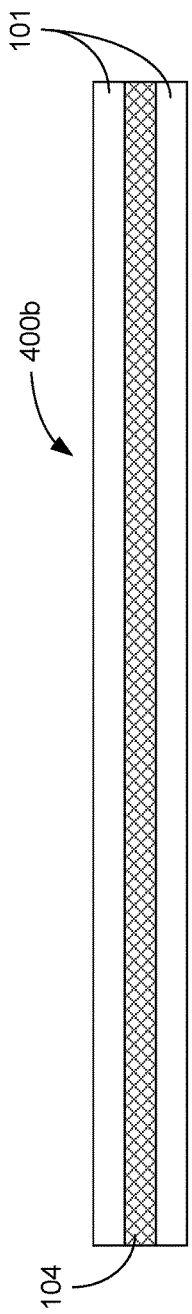

Referring to FIG. 5, shown is a cross-sectional or elevation view of an example of a standard three-ply (or 3-layer) plywood sheet 300 including three layers 101 of wood veneer secured together using an adhesive 102 disposed between the wood layers 101. The manufacturing sequence of the composite plywood will contain the polymeric material as a single layer within the plywood veneer FIGS. 6, 7 and 8, show cross-sectional or elevation views of examples of polymer composite reinforced plywood sheets 400 including 3 layers. The polymer composite reinforced plywood can comprise a plurality of wood layers 101 and an intermittent layer of a flexible polymeric film and/or a lamination as previously discussed.

In the plywood sheet 400a of FIG. 6, the second wood veneer layer 101 is replaced with the ultra tear resistant multilayer PET film 103, which is sufficiently laminated to the adjacent wood veneer layers 101. For instance, 3M's Ultra 400 (4 mil) tear resistant polyester film 103 can be used to replace the second wood veneer ply 101 within the 3-ply (3-layer) plywood construction or 3M's Ultra 600 (6 mil) tear resistant polyester film and/or Madico's Protekt® LCL-600XSR multilayer film (6 mil) 103 can be used to replace the second wood veneer ply 101 within the 3-ply (3-layer) plywood construction. An adhesive (e.g., polymeric MDI adhesive) applied to the polymeric film 103 can facilitate bonding with the wood veneer layers 101.

In the example of FIG. 6, the polymer composite reinforced plywood sheet 400b is modified 3-ply (or 3-layer) plywood using other polymeric films 104. In the plywood sheet 400b of FIG. 6, the second wood veneer layer 101 can be replaced with a polyester film and/or thermoplastic polyurethane. For instance, an eight mil (8 mil) polyester film 104 can be used to replace the second wood veneer ply 101 within the 3-ply (3-layer) plywood construction, a ten mil (10 mil) polyester film 104 can be used to replace the second wood veneer ply 101 within the 3-ply (3-layer) plywood construction, or Skydex® Technologies, Inc. (5 mil~10 mil) overpressure absorbing film and/or Kydex (Acrylic-PVC Copolymer) Flax 72939 28 mil film can replace the second wood veneer ply 101 within the 3-ply (3-layer) plywood construction.

In the example of FIG. 7, the polymer composite reinforced plywood sheet 400c is modified 3-ply (or 3-layer) plywood using other composite laminates 105. In the plywood sheet 400c of FIG. 7, the second wood veneer layer 101 can be replaced with aramid fiber, carbon fiber, and/or fiberglass. For instance, BGF Industries Inc., (4 mil~10 mil) woven Kevlar fabric, which can be laminated to a polyester film, and used to replace the second wood veneer ply 101 within the 3-ply (3-layer) plywood construction, BGF Industries Inc., (5 mil to 10 mil) high strength woven carbon fiber fabric, which can be laminated to a polyester film, and used to replace the second wood veneer ply 101 within the 3-ply (3-layer) plywood construction, or BGF Industries Inc., (5 mil to 10 mil) high strength woven glass fabric, which can be laminated to a polyester film, and used to replace the second wood veneer ply 101 within the 3-ply (3-layer) plywood construction. A suitable adhesive applied to the polymeric films in layer 105 can provide sufficient bonding to the adjacent wood veneer layers 101 so as to not need the use of standard veneer adhesives 102 for achieving such lamination.

Referring next to FIG. 9, shown is a cross-sectional or elevation views of examples of a standard or typical high pressure laminate (HPL) 500 including a clear protective overlay 106, a decorative paper 107, a kraft paper backing 108, and a base 109 comprising either medium density fiber-board, chipboard, plywood, and/or wood. FIG. 10 shows a cross-sectional or elevation vies of an example of a modified low pressure laminate (LPL) 600 including, but not limited to, an adhesive coated polymeric film 110 on a base 109. The polymeric film 110 has replaced the protective overlay 106, decorative paper 107, and kraft paper backing 108. In the example of FIG. 10, the polymeric film 110 has been reversed printed and is sufficiently laminated to the base material 109 utilizing a thermal adhesive system.

In one embodiment, the polymeric film 110 of the modified LPL 600 can be 3M's Ultra 400 (4 mil) tear resistant polyester film, which can replace the protective overlay 106 and melamine resin used as protection for the decorative paper 107. In addition, the kraft paper 108 and phenolic resin backer can also be eliminated. The polymeric film 110 can be affixed directly to MDF, chipboard, and or plywood. In another embodiment, the polymeric film 110 can be 3M's Ultra 600 (6 mil) tear resistant polyester film or Madico's Protekt® LCL-600XSR multilayer film (6 mil), which can replace the protective overlay 106 and melamine resin used as protection for the decorative paper 107. In addition, the kraft paper 108 and phenolic resin backer can also be eliminated. The polymeric film 110 can be affixed directly to MDF, chipboard, and or plywood. In a third embodiment, an eight mil (6 mil) polyester film 110 can replace the protective overlay 106 and melamine resin used as protection for the decorative paper 107. In addition, the kraft paper 108 and phenolic resin backer can also be eliminated. The polyester film 110 can be affixed directly to MDF, chipboard, and or plywood.

The manufacture of softwood or hardwood plywood consists of nine main processes: 1) log storage; 2) log debarking and bucking; 3) heating the logs; 4) peeling the logs into veneers; 5) drying the veneers; 6) gluing the veneers together; 7) pressing the veneers in a hot press; 8) plywood cutting; and 9) other finishing processes such as sanding. The initial step of debarking is accomplished by feeding logs through one of several types of debarking machines. The purpose of this operation is to remove the outer bark of the tree without substantially damaging the wood. After the bark is removed, the logs are cut to appropriate lengths in a step known as bucking.

The logs (now referred to as blocks) then are heated to improve the cutting action of the veneer lathe or slicer, thereby generating a product from the lathe or slicer with better surface finish. Blocks are heated to around 93° C. (200° F.) using a variety of methods—hot water baths, steam heat, hot water spray, or a combination of the three. After heating, the logs are processed to generate veneer. For most applications, a veneer lathe is used, but some decorative, high quality veneer is generated with a veneer slicer. The slicer and veneer lathe both work on the same principle; the wood is compressed with a nosebar while the veneer knife cuts the blocks into veneers that are typically 3 mm (⅛ in.) thick. Decorative hardwood veneers are usually sliced much thinner than 3 mm (⅛ in.) thick. The veneer pieces are then clipped to a usable width, typically 1.37 m (54 in.), to allow for shrinkage and trim.

Veneers are taken from the clipper to a veneer dryer where they are dried to moisture contents that range from around 1 to 15 percent, dry basis. The veneers can be cooled to prevent glue from curing on the veneers during the layup and glue spreading operations before they reach the plywood press.

When the veneers have been dried to their specified moisture content, they are conveyed to a layup operation, where a thermosetting resin is spread on the veneers. The two main types of resins are phenol-formaldehyde, which is used for softwood plywood and exterior grades of hardwood plywood, and urea-formaldehyde, which is used to glue interior grades of hardwood plywood. The resins are applied by glue spreaders, curtain coaters, or spray systems. Spreaders have a series of rubber-covered grooved application rolls that apply the resin to the sheet of veneer. Generally, resin is spread on two sides of one ply of veneer, which is then placed between two plies of veneer that are not coated with resin.

In the improved composite plywood process, the above adhesive step may be obviated in some implementations. The polymeric films used for the composite plywood can be coated with an adhesive either in-line during the film manufacturing or off-line after manufacturing. Various adhesive systems may be advantageously employed. Those include hot melt thermoplastics such as VA-E, EVA, Polyurethanes, TPUs, Polyesters, Polyamide, SBR, etc. Most of these adhesive systems can be applied from a water-borne dispersion. However, some may need solvent-borne adhesive systems, which is usually coated off-line. Still other heat activated adhesive systems can be co-extruded with the polymeric films. Both sides of the polymeric film can be coated or co-extruded as needed. Further processes such as metallization (if necessary for radiant barriers) and/or perforation may also be carried out to get a roll form of ready to laminate adhesive coated film.

The composite plywood constructions can thus be manufactured in an inline process that would place the material from the roll form as a single layer or possibly as intermittent layers, contained within the plywood veneer. If intermittent layers are constructed, the adjacent polymeric layers can be aligned in a parallel/perpendicular fashion to improve the cohesive strength of the laminated plywood as described below.

The assembly of the plywood panels can be symmetrical on either side of a neutral center in order to avoid excessive warpage or warping. For example, a five-ply panel can be laid up in the following manner. A back, with the grain direction parallel to the long axis of the panel, is placed on the assembly table. The polymeric film is laid parallel on the long axis same as the above veneer. The next center veneer has a grain direction perpendicular to that of the back. The second polymeric film is then laid perpendicular (short axis) same as the second veneer. The outer third veneer has a grain perpendicular to the previous veneer and placed like the back with the grain parallel to the long axis of the plywood panel.

By using thermosetting adhesives, assembly of the veneer and the polymeric films can be done seamlessly from rolls of the film. This streamlines the process and avoids the step of spreading of the thermosetting resin. Applying thermosetting adhesives such as, but not limited to, phenol formaldehyde, polymeric MDI (isocyanate) and/or a two-part crosslinkable aqueous emulsion polymer such as ISOSET WD3-A322 from Ashland to the polymeric film prior to assembly with the wood veneer layers can provide such an advantage. In other implementations, the thermosetting adhesive may be applied to the wood veneer plys before assembly with the polymeric film.

The laid-up assembly of veneers and polymeric films can then be sent to a hot press in which it is consolidated under heat and pressure. Hot pressing has two main objectives: (1) to compress the polymeric sheet over each sheet of veneer that it is in contact with; and (2) to heat activate hot melt adhesives which were coated on the polymeric films or to heat activate the thermosetting adhesives (e.g., phenol formaldehyde, polymeric MDI (isocyanate), or a two-part crosslinkable aqueous emulsion polymer such as ISOSET WD3-A322 from Ashland). Typical press temperatures range from 132° to 165° C. for 2 to 7 minutes at 650~850 psi. The time and temperature vary depending on the wood species used, the resin used, and the press design. The plywood then is taken to a finishing process where edges are trimmed; the face and back may or may not be sanded smooth. The type of finishing depends on the end product desired.

Low Pressure Laminates (LPL) generally weigh between 80-100 g/m$^2$. The fibers used to make these papers are typically 80% short hardwood fibers and 20% long softwood fibers. There are several variations in this basic furnish. Hardwoods are used to provide a homogenous formation and softwoods are used to provide bulk and strength. With the end use in mind, decorative papers can be saturated with resin so that they are able to withstand the treating process with adequate wet strength. Porosity values for LPL papers are higher than those for HPL paper which will provide more surface resin at the same resin content.

All grades of paper have a combination of fillers and pigments to achieve the desired color and/or opacity. Certain grades of paper, typically whites, can carry over 40% filler to provide a clean, opaque sheet. Common fillers are titanium dioxide and clay.

Melamine formaldehyde resin is the common resin system used for LPL production. This water-based resin has formaldehyde: melamine ratio of 1.5:1 to 2:1. LPL resin systems are highly catalyzed with a variety of acidic catalysts. Other additives such as defoamers, wetting agents and slip/mar agents are used to enhance the process and/or product. Treating of decorative papers is commonly done on a dip and squeeze treater. In this process, the paper web is passed over steam nozzles that moisturize the sheet and aid internal saturation. It is then passed across the surface of a pre-wet roll which applies 40° C. resin, at 50-65% solids, to one side of the sheet. The sheet travels up and provides time for the resin to drive the air out the sheet and completely wet-out the fibers before it is fully immersed in the resin. The sheet then passes through two rolls, which controls the amount of resin pick-up by maintaining the gap between the two rolls. After leaving the squeeze rolls, the web passes across two smoothing rolls that are spinning on the surface of the sheet to distribute the remaining surface resin. The web then enters a 100-140° C. air flotation oven that b-stages the sheet. At the end of the oven the sheet is cooled and either sheeted or rewound for further use.

Another resin system that is gaining popularity with LPL producers is a dual stage urea/melamine resin system. This process "fills" the sheet with urea formaldehyde resin, partially dries the sheet, then topcoats it with melamine formaldehyde resin. Gravure rolls are commonly used to apply the melamine to both sides of the sheet in the split oven configuration. Urea resin is a lower cost resin that doesn't have the same level of performance of melamine, but can be used to "fill" the sheet. This results in lower melamine resin usage, but doesn't sacrifice any of the finished product performance, as the top surface is still melamine.

In most cases, treated paper is pressed in a single opening flat press on a suitable substrate. A melamine treated, balance sheet is usually pressed on the bottom of the substrate to provide uniform construction and minimize the possibility of warpage or warping. Common substrates include medium density particleboard (480-880 kg/m$^3$) and medium density fiberboard (480-880 kg/m$^3$). Melamine treated papers are pressed at pressures of 2070-2760 kPa (300-400 psi) and temperatures of 150-200° C. (300-400° F.). Cycle times range from 15 to 150 seconds depending on the product and condition of the equipment. Heat is provided on both sides of the laminate by large steel platens that are either heated with steam, hot water, or hot oil. Pressure is provided by numerous hydraulic rams. Surface finish of the laminate is determined by the texture of the press plates which the decorative paper is pressed against. These plates can be replaced to provide alternative finishes, as well.

A very small portion of LPL production is done with polyester resin treated decorative paper. This solvent based resin system has the environmental concerns of acetone (40%) and 50% higher cost than melamine. Certain grades of decorative paper are incompatible with this solvent-based system, as some pigments will bleed excessively. Polyester treating is done typically on a dip and scrape treater that uses wire wound Mayer rods to scrape a consistent amount of surface resin off the sheet. Polyester resin based sheet is pressed at temperatures of 150-200° C. (300-400° F.) and pressures of 1200-1400 kPa (175-200 psi).

In our improved process, the modified low pressure laminate (LPL) will use a polymeric film, such as a tear resistant polyester, having both a high degree of resistance to impact, water, chemicals, and minor abrasions, affixed directly to MDF, chipboard, and or plywood. This polymeric material will be reverse printed with a pattern or color; which when bonded to the board will provide an inherent surface protection to the printed side of the polymeric material. This will eliminate both the current protective overlay found in High Pressure Laminates, the very costly decorative paper, the Kraft paper backer, and the costly resin systems. Reducing the structure's thickness and using the glue-less lamination process will enable this highly durable laminate to be processed under lower cost conditions seen in making a traditional low pressure laminate, which already uses lower pressures and temperatures compared to a high pressure laminate.

Although the improved composite plywood has broad applicability, the following application fields would have particular benefits:

- roof & wall sheathing and/or structurally insulated panels (SIPS);
- performance rated exterior wood siding;
- structural sub-floor panels;
- laminated veneer lumber such as for I-joists;
- decking, wall, and roof assemblies for tractor trailers and/or shipping/freight containers; and
- insulation membrane for liquefied natural gas (LNG) carriers. Applications for the modified laminates include decorative indoor panels with a printable surface manufactured inline and using polymeric materials related to end uses typical of LPL and HPL; and engineered and/or laminate flooring.

Various test criteria can be used to gage the efficacy of the improved composite plywood, and to certify the polymer reinforced composite plywood, based upon the follow testing protocols and standards. Windborne debris and pressure differentials; hurricane & tornado testing can be carried out in accordance with one or more of: ASTM E1886—Standard Test Method for Performance of Exterior Windows, Curtain Walls, Doors, and Impact Protective Systems Impacted by Missile(s) and Exposed to Cyclic Pressure Differentials; ASTM E 1996-12a Standard Specification for Performance of Exterior Windows, Curtain Walls, Doors, and Impact Protective Systems Impacted by Windborne Debris in Hurricanes; Florida Testing Application Standard (TAS) 201-94, Impact Test Procedures; Florida Testing Application Standard (TAS) 202-94, Criteria for testing Impact and Non-Impact Resistant Building Envelope Components Using Uniform Static Air Pressure Loading; Florida Testing Application Standard (TAS) 203-94, Criteria for Testing Products Subject to Cyclic Wind Pressure Loading; FEMA 320, "Taking Shelter From the Storm: Building a Safe Room Inside Your House"; and/or FEMA 361, "Design and Construction Guidance for Community Shelters."

Structural testing can be carried out in accordance with one or more of: ASTM E 72-10 Strength Tests of Panels for Building Construction; ASTM D2718-00 Standard Test Methods for Structural Panels in Planar Shear (Rolling Shear); ASTM D2719-89 Standard Test Methods for Structural Panels in Shear Through-the-Thickness; ASTM D3044-94 Standard Test Method for Shear Modulus of Wood-Based Structural Panels; ASTM D906-98 Standard Test Method for Strength Properties of Adhesives in Plywood Type Construction in Shear by Tension Loading; and/or ASTM D3500-90 Standard Test Methods for Structural Panels in Tension. Moisture vapor transmission testing can be carried out in accordance with ASTM G153-04 Standard Practices for Operating Enclosed Carbon Arc Light Apparatus for Exposure of Nonmetallic Materials. Weatherability testing can be carried out in accordance with ASTM E 96 Standard Test Methods for Water Vapor Transmission of Materials. Air permeance testing can be carried out in accordance with one or more of: ASTM E 2178-13 Standard Test Method for Air Permeance of Building Materials and/or ASTM E2357-11 Standard Test method for Determining Air Leakage of Air Barrier Assemblies.

Air leakage rate testing can be carried out in accordance with ASTM E 283-04 Standard Test Method for Determining Rate of Air Leakage Through Exterior Windows, Curtain Walls, and Doors Under Specified Pressure Differences Across the Specimen. Static pressure differential can be carried out in accordance with ASTM E 330-02 (2010) Standard Test Method for Structural Performance of Exterior Windows, Doors, Skylights and Curtain Walls by Uniform Static Air Pressure Difference. Hydrostatic resistance testing can be carried out in accordance with one or more of: AATCC 127 Water Resistance: Hydrostatic Pressure Test and/or ASTM D751-06 Standard Test Methods for Coated Fabrics. Surface burn characteristics testing can be carried out in accordance with one or more of: ASTM E84-13 Standard Test Method for Surface Burning Characteristics of Building Materials and/or ASTM E2579-13 Standard Practice for Specimen Preparation and Mounting of Wood Products to Assess Surface Burning Characteristics. Certification of the polymer reinforced composite plywood to the listed standards can be performed by third party entities.

Various test criteria can be used to gage the efficacy of the improved LPL, and to certify the modified LPL, based upon the follow testing protocols and standards. Appearance testing can be carried out in accordance with one or more of: NEMA LD 3-2005, Section 3.1 and/or EN 438-3-6.2. Ball impact resistance can be carried out in accordance with one or more of: NEMA LD 3-2005, Section 3.8; NALFA LF01-2008; and/or EN 438-2-20. Boiling water resistance testing can be carried out in accordance with one or more of: NEMA LD 3-2005, Section 3.5 and/or EN 438-2-12. Castor chair resistance testing can be carried out in accordance with NALFA LF01-2008. Cleanability/stain resistance testing can be carried out in accordance with one or more of: NEMA LD 3-2005, Section 3.4; NALFA LF01-2008; and/or EN 438-2-26. Dimensional change & tolerance testing can be carried out in accordance with one or more of: NALFA LF01-2008; NEMA LD 3-2005, Section 3.11 & 3.12; EN 438-2-17; and/or EN 438-2-18.

Dart impact resistance testing can be carried out in accordance with NEMA LD 3-2005, Section 3.9. Fire test to smoke density testing can be carried out in accordance with ASTM E-662. Formability testing can be carried out in accordance with NEMA LD 3-2005, Section 3.14. Gloss testing can be carried out in accordance with NEMA LD 3-2005, Section 3.2. High temperature resistance testing can be carried out in accordance with one or more of: NEMA LD 3-2005, Section 3.6 and/or EN 438-2-16. Light resistance testing can be carried out in accordance with one or more of: NEMA LD 3-2005, Section 3.3; NALFA LF01-2008; and/or EN 438-2-27. Radiant heat resistance testing can be carried out in accordance with NEMA LD 3-2005, Section 3.10. Static load testing can be carried out in accordance with NALFA LF01-2008. Scratch resistance testing can be carried out in accordance with one or more of: NEMA LD 3-2005, Section 3.7 and/or EN 438-2-25.

Surface flammability testing can be carried out in accordance with one or more of: ASTM E-84; ASTM E-162; and/or EN 438-2-30. Surface bond strength testing can be carried out in accordance with NALFA LF01-2008. Thickness swell testing can be carried out in accordance with NALFA LF01-2008. Water resistance testing can be carried out in accordance with one or more of: NALFA LF01-2008 and/or EN 438-2-14. Wear resistance testing can be carried out in accordance with one or more of: NEMA LD 3-2005, Section 3.13; NALFA LF01-2008; and/or EN438-2-10. Certification of the modified LPL to the listed standards can be performed by third party entities.

Referring to FIG. 11, shown is a table listing a plurality of polymer reinforced composite plywood samples that were fabricated for testing. All composite plywood samples listed in the examples below were pressed on a pilot-scale 200-ton, 24"×24" compression press. The fabricated samples were usually small experimental sizes (usually 11"×11"). The veneer used for the plywood construction was acquired pre-sliced and pre-cut to the length of the press (usually 22"×22"). Typically the veneers used were 3 mm (⅛") thick. The pre-sliced and pre-cut veneer was then prepared for the press. A thermosetting resin was spread on the veneers. The two main types of resins tried were phenol-formaldehyde, which is used for softwood plywood and exterior grades of hardwood plywood, and Polymeric MDI. However, a two-part crosslinkable aqueous emulsion polymer such as ISO-SET WD3-A322 with Isoset CX-47 crosslinker from Ashland can also be used. In this case, the crosslinker is added just before the coating operation and the 2-part adhesive has a limited pot-life of a few hours. The resins were applied by hand using a brush. Generally, resin was spread on two sides of one ply of veneer, which was then placed between the layers to be laminated as described below. In some cases, as required, the resin was also applied onto the engineered thermoplastic film before laminating to the adjacent wood veneer for additional adhesion. Thus, each face of each layer had some form of adhesive applied. The table of FIG. 11 summarizes the processing conditions used for the polymer reinforced composite plywood such as temperature and time of pressing, type of adhesive used, number of veneers versus composite, etc.

A first example utilized stiff, biaxially oriented monolayer films for construction of 5-ply (5-layer) polymer reinforced composite plywood samples for testing. The stiff, biaxially oriented monolayer films used for the construction were the as follows:

SKC's SH40 700 gage polyester film (Panel#s 14 and 18 in the table of FIG. 11); and DuPont-Teijin's Teonex Q51 700 Gage PEN (polyethylene naphthalate) film (Panel#s 13 and 16 in the table of FIG. 11).

Other stiff, biaxially oriented monolayer films can also be used to fabricate the reinforced composite plywood.

For the 5-ply plywood system, the following three configurations were utilized:

Stiff, biaxially oriented monolayer film was used to replace the third wood veneer ply within the 5-ply (5-layer) plywood construction giving a veneer/veneer/polymer/veneer/veneer (v/v/p/v/v) construction where the middle (or third) layer of the plywood sample was the stiff monolayer engineered thermoplastic film to those described above and the outer two layers were wood veneer; and Stiff, biaxially oriented monolayer film was used to replace both the second and fourth wood veneer ply within the 5-ply (5-layer) plywood construction giving a v/p/v/p/v construction where the second and fourth layers of the plywood sample was the stiff monolayer engineered thermoplastic film and the other three layers were wood veneer.

Additionally, the above assembly of the plywood panels was designed to be symmetrical on either side of a neutral center in order to avoid excessive warpage or warping. Thus, the back veneer, with the grain direction parallel to the long axis of the panel, was first placed on the press assembly table. The polymeric film was laid parallel to the long axis of the back veneer. The next center veneer had a grain direction perpendicular to that of the back veneer. The second polymeric film was then laid perpendicular (short axis) to that of the back veneer, the same as the center veneer. The outer veneer had a grain perpendicular to the center veneer and parallel to the grain of the back veneer, with the grain parallel to the long axis of the plywood panel. In the table of FIG. 11, the stiff, biaxially oriented monolayer film for construction of a 5-ply (5-layer) polymer reinforced composite plywood were represented from Panel#s 13, 14, 16 and 18.

After the plywood veneer and the monolayer engineered thermoplastic film panel composite structure combination to those described above was laid out in the press, the construction was then consolidated and laminated under heat and pressure. Hot pressing had two main objectives: 1) to compress and adhere the polymeric sheet over each sheet of veneer that it is in contact with; and 2) to heat activate hot melt adhesives or the thermoset resins which were coated on the layer surfaces. Typical press temperatures used were from 132° to 175° C. for 2 to 7 minutes at 650–850 psi. The pressure in the press was compensated automatically to account for any thickness variations of the various plywood panels laminated. The time and temperature vary depending on the wood species used, the resin used, and the press design. The laminated plywood panels were then was taken to a finishing process where the edges were trimmed to the size of the engineered thermoplastic film used, which was normally smaller than the size of the veneer sheet.

A second example utilized ductile, amorphous and pliable monolayer films were also used for construction of 5-ply (5-layer) polymer reinforced composite plywood samples for testing. As discussed above, plywood samples listed in the examples below were pressed on a pilot-scale 200-ton, 24"×24" compression press. As before, the fabricated samples were usually small experimental sizes (usually 11"×11"). The use of veneers and adhesives described above was also applied for the construction of these plywood samples. Thus, the veneers used were 3 mm (⅛") thick. The pre-sliced and pre-cut veneer was then prepared for the press. A thermosetting resin was spread on the veneers. As before, each face of each layer had some form of adhesive applied. The ductile and pliable monolayer films used for this construction were the following:

Lexan polycarbonate 62.5 mil film (Panel#s 11 and 15 in the table of FIG. 11); and Kydex (Acrylic-PVC Copolymer) Flax 72939 28 mil film (Panel#s 12 and 17 in the table of FIG. 11).

For the 5-ply plywood system, the following 3 configurations were utilized:

Ductile and pliable monolayer film was used to replace the third wood veneer ply within the 5-ply (5-layer) plywood construction giving a v/v/p/v/v construction where the middle (or third) layer of the plywood sample was the ductile monolayer engineered thermoplastic film described above, and the outer two layers were wood veneer; and Ductile and pliable monolayer film was used to replace both the second and fourth wood veneer ply within the 5-ply (5-layer) plywood construction giving a v/p/v/p/v construction where the second and fourth layers of the plywood sample were the ductile monolayer engineered thermoplastic film and the other three layers were wood veneer.

Other ductile and pliable monolayer films can also be used to fabricate the reinforced composite plywood.

In the table of FIG. 11, the ductile and pliable monolayer film for construction of a 5-ply (5-layer) polymer reinforced composite plywood were represented from Panel#s 11, 12, 15 and 17. As before, the above assembly of the plywood panels was designed to be symmetrical on either side of a neutral center in order to avoid excessive warpage or warping.

After the plywood veneer and the engineered thermoplastic film panel composite structure combination described above was laid out in the press, the construction was then consolidated and laminated under heat and pressure. As before, typical press temperatures used were from 132° to 175° C. for 2 to 7 minutes at 650~850 psi. The pressure in the press was compensated automatically to account for any thickness variations of the various plywood panels laminated. The time and temperature vary depending on the wood species used, the resin used, and the press design. The laminated plywood panels were then taken to a finishing process where the edges were trimmed to the size of the engineered thermoplastic film used, which was normally smaller than the size of the veneer sheet.

A third example utilized a multilayer film having alternate stiff and ductile/amorphous layers for construction of 5-ply (5-layer) polymer reinforced composite plywood samples for testing. As before, the plywood samples were pressed on a pilot-scale 200-ton, 24"×24" compression press. Again, the fabricated samples were usually small experimental sizes (usually 11"×11"). The use of the veneers and adhesives described above and summarized in the table of FIG. 11 was also used for the construction of these samples. Thus, the veneers used were 3 mm (⅛") thick. The pre-sliced and pre-cut veneer was then prepared for the press. A thermosetting resin was spread on the veneers. As before, each face of each layer had some form of adhesive applied. The multilayer film having alternate stiff and ductile layers used for this construction was 3M's Scotchshield, both the Ultra 400 Series and the Ultra 600 Series. Alternately, Madico's Protekt® LCL-600XSR multilayer film (6 mil) can also be used.

For the 5-ply plywood system, the following four configurations were utilized:

3M's Ultra 400 (4 mil) tear resistant polyester film was used to replace the third wood veneer ply within the 5-ply (5-layer) plywood construction giving a v/v/p/v/v construction where the middle (or third) layer of the plywood sample was the 400 gage impact and tear resistant multi-layered engineered thermoplastic film from 3M, and the outer two layers were wood veneer;

3M's Ultra 600 (6 mil) tear resistant polyester film was used to replace the third wood veneer ply within the 5-ply (5-layer) plywood construction giving a v/v/p/v/v construction where the middle (or third) layer of the plywood sample was the 600 gage impact and tear resistant multi-layered engineered thermoplastic film from 3M, and the outer two layers were wood veneer;

3M's Ultra 400 (4 mil) tear resistant polyester film was used to replace both the second and fourth wood veneer ply within the 5-ply (5-layer) plywood construction giving a v/p/v/p/v construction where the second and fourth layers of the plywood sample were the 400 gage impact and tear resistant multi-layered engineered thermoplastic film from 3M, and the other three layers were wood veneer; and 3M's Ultra 600 (6 mil) tear resistant polyester film was used to replace both the second and fourth wood veneer ply within the 5-ply (5-layer) plywood construction giving a v/p/v/p/v construction where the second and fourth layers of the plywood sample were the 600 gage impact and tear resistant multi-layered engineered thermoplastic film from 3M, and the other three layers were wood veneer (Panel#s 6-10 of the table of FIG. 11).

In the table of FIG. 11, the multilayer film having alternate stiff and ductile layers for construction of a 5-ply (5-layer) polymer reinforced composite plywood were represented from Panel#s 6, 7, 8, 9 and 10 depending on the use of various adhesives and conditions. As before, the above assembly of the plywood panels was designed to be symmetrical on either side of a neutral center in order to avoid excessive warpage or warping.

After the plywood veneer and the engineered thermoplastic film panel composite structure combination described above was laid out in the press, the construction was then consolidated and laminated under heat and pressure. As before, typical press temperatures used were from 132° to 175° C. for 2 to 7 minutes at 650~850 psi. The pressure in the press was compensated automatically to account for any thickness variations of the various plywood panels laminated. The time and temperature vary depending on the wood species used, the resin used, and the press design. The laminated plywood panels were then taken to a finishing process where the edges were trimmed to the size of the engineered thermoplastic film used, which was normally smaller than the size of the veneer sheet.

A fourth example utilized composite laminates for construction of 5-ply (5-layer) polymer reinforced composite plywood samples for testing. Composite laminates were used instead of polymeric films for construction of the engineered composite plywood: Composite laminates used were:

Carbon fiber based high strength woven carbon fiber fabric laminated to a polyester film (5-10 mil) from BGF Industries Inc. (Panel#19 in the Table of FIG. 11)

Fiber Glass based high strength woven glass fabric laminated to a polyester film (5-10 mil) from BGF Industries Inc. (Panel#4 in the table of FIG. 11)

In all cases, the process of construction of the engineered composite plywood was the same to those described above using the v/p/v/p/v construction where the second and fourth layers of the plywood sample were replaced with the composite laminate film. The press conditions were also identical to those described above. In the table of FIG. 11, the carbon fabric was Panel#19 and fiber glass fabric was Panel#4.

A traditional 5-ply plywood sample was also constructed identically to the engineered composite plywood construction described above, except that all the layers were constructed out of wood veneer sheets. The press conditions were also identical to those described above. Since the thickness of the traditional panel varied from the composite panels, the pressure in the press was compensated automatically. In the table of FIG. 11, the traditional five-ply (5-layer) plywood without a polymer reinforced composite film was represented from Panel#s 1 and 5.

A fifth example utilized monolayer films, both stiff, biaxially oriented and ductile/amorphous, for construction of 3-ply (3-layer) and 7-ply (7-layer) polymer reinforced composite plywood samples for testing. Similar to the 5-ply, both 3-ply and 7-ply engineered composite plywood with both stiff and ductile monolayer polymeric films were also constructed. The following 4 polymeric films were utilized:

SKC's SH40 700 gage polyester film;
DuPont-Teijin's Teonex Q51 700 Gage PEN (polyethylene naphthalate) film;
Lexan polycarbonate 62.5 mil film; and
Kydex (Acrylic-PVC Copolymer) Flax 72939 28 mil film.

In all cases, for the 3-ply plywood system the configuration utilized was v/p/v, where "v" was the wood veneer and "p" was the monolayer polymeric films. For the 7-ply plywood system, the configuration utilized was v/p/v/p/v/p/v, where "v" was the wood veneer and "p" was the monolayer polymeric films. The press conditions were also identical to those described above.

A sixth example utilized a multilayer film having alternate stiff and ductile/amorphous layers for construction of 3-ply (3-layer) and 7-ply (7-layer) polymer reinforced composite plywood samples for testing. Similar to the 5-ply, both 3-ply and 7-ply engineered composite plywood with 3M's Ultra tear resistant PET films or Madico's Protekt® LCL-600XSR multilayer film (6 mil) was also constructed. For the 3-ply plywood system, the configuration utilized was v/p/v, where "v" was the wood veneer and "p" was the polymeric multilayer film having alternate stiff and ductile layers. For the 7-ply plywood system, the configuration utilized was v/p/v/p/v/p/v where "v" was the wood veneer and "p" was the polymeric multilayer film having alternate stiff and ductile layers. The press conditions for the 3-ply structures were identical to the 5-ply as described above.

Traditional 3-ply and 7-ply plywood samples were constructed identically to the engineered composite plywood construction described above, except that all the layers were constructed out of wood veneer sheets. The press conditions were also identical to those described above.

A seventh example utilized an intermittent monolayer film having alternate stiff and ductile/amorphous layers for construction of 5-ply (5-layer) and 7-ply (7-layer) polymer reinforced composite plywood samples for testing. Similar to the third example, monolayer films were used for construction. However, intermittent monolayer films were employed having alternate stiff/biaxially oriented and ductile/amorphous polymeric film layers for construction of both a five-ply (5-layer) and seven-ply (7-layer) polymer reinforced composite plywood. As before, plywood samples listed in the examples below were pressed on a pilot-scale 200-ton, 24"×24" Compression Press. Also, the fabricated samples were usually small experimental sizes (usually 11"×11"). The use of veneers and adhesives described above and summarized in the table of FIG. 11 was also used for the construction. Thus, the veneers used were 3 mm (⅛") thick. The pre-sliced and pre-cut veneer was then prepared for the press. A thermosetting resin based on MDI was spread on the veneers. As before, each face of each layer had some form of adhesive applied.

The stiff/biaxially oriented monolayer films used were:
SKC's SH40 700 gage polyester film; and
DuPont-Teijin's Teonex Q51 700 Gage PEN (polyethylene naphthalate) film; and the ductile, amorphous and pliable monolayer films used were:
Lexan polycarbonate 62.5 mil film; and
Kydex (Acrylic-PVC Copolymer) Flax 72939 28 mil film.

The 5-ply (5-layer) polymer reinforced composite plywood utilized the following configuration v/p1/v/p2/v, where "v" was the wood veneer, "p1" was the stiff monolayer film and "p2" was the ductile monolayer film. The seven-ply (7-layer) polymer reinforced composite plywood utilized the following two configurations:

configuration1: v/p1/v/p2/v/p1/v, where "v" was the wood veneer, "p1" was the stiff monolayer film and "p2" was the ductile monolayer film; and
configuration2: v/p2/v/p1/v/p2/v, where "v" was the wood veneer, "p1" was the stiff monolayer film and "p2" was the ductile monolayer film.

As before, the plywood samples were designed to be symmetrical on either side of a neutral center in order to avoid excessive warpage or warping.

After the plywood veneer and the engineered thermoplastic film panel composite structure combination was laid out in the press, the construction was then consolidated and laminated under heat and pressure. As before, typical press temperatures used were from 132° to 175° C. for 2 to 7 minutes at 650-850 psi. The pressure in the press was compensated automatically to account for any thickness variations of the various plywood panels laminated. The time and temperature vary depending on the wood species used, the resin used, and the press design. The laminated plywood panels were then was taken to a finishing process where the edges were trimmed to the size of the engineered thermoplastic film used, which was normally smaller than the size of the veneer sheet.

The polymer reinforced composite plywood samples (see the table of FIG. 11) and traditional plywood samples were tested using the testing protocols and standards described above. The Appendix provides additional information about testing protocols and standards that can be used to evaluate the polymer reinforced composite plywood. The polymer reinforced composite plywood samples outperformed the corresponding traditional plywood structures. In addition, the engineered composite plywood structures were considerably lighter than traditional plywood systems.

Examples of a modified low pressure laminates (LPLs) were also fabricated for testing. All modified LPLs listed in the examples below were pressed on a pilot-scale 200-ton, 24"×24" compression press. The fabricated samples were usually small experimental sizes (usually 11"×11"). Common substrates included medium density particleboard (480-880 kg/m$^3$) and medium density fiberboard (480-880 kg/m$^3$). The polymeric films were pressed at pressures of 2070-2760 kPa (300-400 psi) and temperatures of 150-200° C. (300-400° F.). Cycle times ranged from 15 to 150 seconds depending on the product and condition of the equipment.

Examples of polymeric films used to make the modified LPLs were:
- 3M's Ultra 600 (6 mil) tear resistant polyester film;
- Madico's Protekt® LCL-600XSR multilayer film (6 mil)
- SKC's SH40 700 gage polyester film;
- DuPont-Teijin's Teonex Q51 700 Gage PEN (polyethylene naphthalate) film;
- Lexan polycarbonate 62.5 mil film; and
- Kydex (Acrylic-PVC Copolymer) Flax 72939 28 mil film All the above composite examples were used to replace the protective overlay and melamine resin used as protection for the decorative paper. In addition, the kraft paper and phenolic resin backer were also eliminated. The polyester film was affixed directly to MDF, chipboard, and or plywood.

The modified LPL samples were tested using the testing protocols and standards described above. The Appendix provides additional information about testing protocols and standards that can be used to evaluate the polymer reinforced composite plywood. It was seen that the modified LPL samples gave significant workflow, cost and performance advantages over traditional low pressure laminates.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A polymeric-based low pressure laminate, comprising a rigid base layer comprising medium density fiberboard (MDF), chipboard or plywood; and
a polymeric film layer comprising a first side and a second side opposite the first side, the second side having a printed wood grain type motif, pattern, or color, where the polymeric film layer is bonded to the rigid base layer under low pressure in a range from 10 bars to 30 bars (145-435 PSI) thereby forming a protective lamination layer over the rigid base layer that provides a high degree of resistance to impact, water, chemicals, and abrasion and scratch resistance of the low pressure laminate.

2. The polymeric-based low pressure laminate of claim 1, wherein the first side of the polymeric film layer is bonded to a first side of the rigid base layer, and the second side of the polymeric film layer is over coated with a protective resin coating thereby protecting the printed wood grain type motif, pattern, or color.

3. The polymeric-based low pressure laminate of claim 2, wherein the protective resin coating comprises melamine formaldehyde resin, urea formaldehyde resin, phenol formaldehyde resin or polyester resin.

4. The polymeric-based low pressure laminate of claim 2, wherein the protective resin coating comprises a radiation curable resin.

5. The polymeric-based low pressure laminate of claim 1, wherein the second side of the polymeric film layer having the printed wood grain type motif, pattern, or color is bonded to a first side of the rigid base layer under the low pressure in the range from 10 bars to 30 bars (145-435 PSI).

6. The polymeric-based low pressure laminate of claim 1, wherein the polymeric film layer comprises a multilayer polymeric polyester film.

7. The polymeric-based low pressure laminate of claim 1, wherein the polymeric film layer is bonded to the rigid base layer by a thermosetting polymeric adhesive comprising melamine formaldehyde resin, urea formaldehyde resin, phenol formaldehyde resin, acrylic resin, polyester resin, or polyurethane resin.

8. The polymeric-based low pressure laminate of claim 1, wherein the polymeric film layer is bonded to the rigid base layer by a radiation curable adhesive.

9. The polymeric-based low pressure laminate of claim 2, wherein the protective resin coating comprises acrylic resin or polyurethane resin.

10. The polymeric-based low pressure laminate of claim 1, wherein the polymeric film layer comprises a monolayer polymeric polyester film.

11. The polymeric-based low pressure laminate of claim 2, wherein the protective resin coating comprises a heat activated resin.

12. The polymeric-based low pressure laminate of claim 1, wherein the polymeric film layer is bonded to the rigid base layer by a heat activated adhesive.

13. The polymeric-based low pressure laminate of claim 1, wherein the rigid base layer comprises medium density fiberboard (MDF), chipboard, or plywood.

14. The polymeric-based low pressure laminate of claim 1, wherein the polymeric film layer is opaque.

15. The polymeric-based low pressure laminate of claim 1, wherein the second side comprises a printable surface having the printed wood grain type motif, pattern, or color thereon.

16. The polymeric-based low pressure laminate of claim 15, wherein the printable surface is manufactured inline.

* * * * *